United States Patent
Wenzel

(10) Patent No.: US 6,189,054 B1
(45) Date of Patent: Feb. 13, 2001

(54) SYSTEM FOR OPERATING A CIRCULATING MEMORY WHICH CAN BE ADDRESSED VIA A WRITE AND/OR READ POINTER BY OUTPUTTING A SIGNAL UPON AN OCCURRENCE OF A JUMP OF THE POINTER

(75) Inventor: Andreas Wenzel, München (DE)

(73) Assignee: Infineon Technologies AG, Munich (DE)

(*) Notice: Under 35 U.S.C. 154(b), the term of this patent shall be extended for 0 days.

(21) Appl. No.: 09/156,440

(22) Filed: Sep. 18, 1998

(30) Foreign Application Priority Data

Sep. 18, 1997 (DE) .............................. 197 41 213

(51) Int. Cl.$^7$ .................................................. G06F 13/14
(52) U.S. Cl. ....................... 710/52; 711/110; 365/189.05
(58) Field of Search ........................ 710/52, 53; 711/110, 711/5; 365/73, 230.01, 189.05, 191; 712/241

(56) References Cited

U.S. PATENT DOCUMENTS

| | | | |
|---|---|---|---|
| 4,223,404 | * | 9/1980 | Lowenschuss .................. 375/340 |
| 4,321,694 | * | 3/1982 | Panigrahi et al. .................. 365/77 |
| 4,365,318 | * | 12/1982 | Aichelmann, Jr. et al. ......... 365/200 |
| 4,462,074 | * | 7/1984 | Linde ................................. 712/241 |
| 4,539,657 | * | 9/1985 | Nicholls ............................... 365/45 |
| 4,667,556 | * | 5/1987 | Hanzawa et al. .................... 84/1.01 |
| 4,802,134 | | 1/1989 | Tsujimoto ........................... 365/230 |
| 5,305,253 | * | 4/1994 | Ward .................................... 365/73 |
| 5,455,929 | * | 10/1995 | Bosshart et al. ................ 395/500.36 |
| 5,617,543 | * | 4/1997 | Phillips ............................... 375/372 |
| 5,687,395 | * | 11/1997 | Spencer ................................ 710/52 |
| 5,757,338 | * | 5/1998 | Bassetti et al. ......................... 345/3 |
| 5,758,056 | * | 5/1998 | Barr ........................................ 714/7 |
| 5,929,927 | * | 7/1999 | Rumreich et al. .................... 348/563 |

FOREIGN PATENT DOCUMENTS

19544756A1    6/1996    (DE) .

OTHER PUBLICATIONS

IMB TDB—"High Line Utilization Direct Memory Access, Oct. 1989"—Journal—pp. 143–148.*

* cited by examiner

*Primary Examiner*—Thomas C. Lee
*Assistant Examiner*—Thuan Du
(74) *Attorney, Agent, or Firm*—Herbert L. Lerner; Laurence A. Greenberg; Werner H. Stemer

(57) ABSTRACT

A method and an apparatus for operating a circulating memory that can be addressed by a write pointer and/or a read pointer are disclosed. The method and the apparatus are distinguished by the fact that a jump of the write pointer and/or of the read pointer from the end of the memory to the beginning of the memory and/or vice versa is signaled.

11 Claims, 1 Drawing Sheet

SYSTEM FOR OPERATING A CIRCULATING MEMORY WHICH CAN BE ADDRESSED VIA A WRITE AND/OR READ POINTER BY OUTPUTTING A SIGNAL UPON AN OCCURRENCE OF A JUMP OF THE POINTER

BACKGROUND OF THE INVENTION

Field of the Invention

The present invention relates to a method and an apparatus for operating a circulating memory that can be addressed via a write pointer and/or a read pointer.

Circulating memories that can be addressed via write and/or read pointers and are also referred to as circular buffers or memories are based on "normal" storage devices or memory areas configured for data storage. However, unlike normal memories, the write and/or read pointers are managed in such a way that they are automatically set to the beginning of the memory area when the end of the memory area is overshot, and are automatically set to the end of the memory area when the beginning of the memory area is overshot and, consequently, can never leave the memory area forming the circulating memory.

Such circulating memories have been known for a long time and need no further explanation.

The use of circulating memories proves to be advantageous particularly in the case of regularly recurring or repeated write and/or read operations, because the available memory can be utilized particularly efficiently and the writing in and reading out of data can be effected in a particularly fast and uncomplicated manner for lack of complicated write and read address management.

Regularly recurring or repeated write and read operations occur inter alia but, of course, nowhere near exclusively in digital signal processing, since a relatively large number of program loops have to be cycled through in digital signal processing owing to the regular structure of the algorithms used.

The program loops must be cycled through rapidly and in particular when the input data or signals are intended to be processed in real time. Experience shows that this is not easily possible even when circulating memories are used as storage devices.

SUMMARY OF THE INVENTION

It is accordingly an object of the invention to provide a method and apparatus for operating a circulating memory which can be addressed via a write pointer and/or a read pointer which overcome the above-mentioned disadvantages of the prior art methods and devices of this general type, in which faster and simpler data or signal processing occurs.

With the foregoing and other objects in view there is provided, in accordance with the invention, a method for operating a circulating memory, which includes: addressing a memory having a beginning and an end, with at least one of a write pointer and a read pointer; and outputting a jump signal upon an occurrence of a jump by at least one of the write pointer and the read pointer from the end of the memory to the beginning of the memory.

In accordance with an added feature of the invention, there is the step of outputting a further jump signal upon an occurrence of a jump by at least one of the write pointer and the read pointer from the beginning of the memory to the end of the memory.

Accordingly, it is provided that the jump of the write pointer and/or of the read pointer from the end of the memory to the beginning of the memory and/or vice versa is signaled, and that a signaling device is provided which is configured to signal the jump of the write pointer and/or of the read pointer from the end of the memory to the beginning of the memory and/or vice versa.

The signaling of jumps of the write pointer and/or of the read pointer can be utilized for many different purposes.

Among other things, the sequence of a program to be executed can consequently be made dependent on the memory address of the data that are to be processed by the program to be executed.

Specifically, if the circulating memory is defined or used, for example, such that the jump of the write pointer and/or of the read pointer from the end of the memory to the beginning of the memory and/or vice versa coincides with the intended end of program loops to be executed, then the signaling of the write and/or read pointer jump can be used as a termination condition for a program loop. The control and evaluation of a loop counter (realized by hardware and/or software) which counts the program loop cycles and which has been used to date to identify the end of a program loop can consequently be dispensed with.

The program run and also the data or signal processing which is effected as a result are considerably faster and/or more simple than has been the case to date.

In accordance with an additional feature of the invention, there is the step of configuring the jump signal so that it is recognized by a program using the memory.

In accordance with another feature of the invention, there is the step of using the jump signal as a condition for a conditional jump instruction.

In accordance with a further added feature of the invention, there is the step of defining and using the memory so that the jump of at least one of the write pointer and the read pointer coincides with an intended end of a program loop.

In accordance with a further additional feature of the invention, there is the step of performing the outputting step by one of setting, resetting and changing over an identifier.

In accordance with yet another feature of the invention, there is the step of putting the identifier into a state signaling the occurrence of no jump of the write pointer and the read pointer in response to an external instigation.

In accordance with yet another added feature of the invention, there is the step of outputting different jump signals to differentiate the occurrence of the jump of: the write pointer from the end of the memory to the beginning of the memory; the jump of the write pointer from the beginning of the memory to the end of the memory; the jump of the read pointer from the end of the memory to the beginning of the memory; and the jump of the read pointer from the beginning of the memory to the end of the memory.

In accordance with yet another additional feature of the invention, there is the step of instigating the jump signal with an address generation unit generating or managing at least one of the write pointer and the read pointer. With the foregoing and other objects in view there is provided, in accordance with the invention, in a circulating memory addressed by at least one of a write pointer and a read pointer and having a beginning and an end, an apparatus for operating the circulating memory, including: a signaling device for generating a jump signal signaling the occurrence of a jump by at least one of the write pointer and of the read pointer from the end of the circulating memory to the beginning of the circulating memory; and the signaling device generates a further jump signal upon an occurrence of a jump by at least one of the write pointer and of the read pointer from the beginning of the circulating memory to the end of the circulating memory.

Other features which are considered as characteristic for the invention are set forth in the appended claims.

Although the invention is illustrated and described herein as embodied in a method and apparatus for operating a circulating memory which can be addressed via a write pointer and/or a read pointer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

A circulating memory (circular buffer or circular memory) described in more detail below is part of a microcontroller, where it serves to implement a fast loop in particular for DSP (digital signal processor) applications. However, attention may already be drawn at this point to the fact that the use of the circular buffer described is not restricted thereto. It may also be configured as a separate element or part of any other desired devices and can be used, in principle, for any desired purposes.

Figure 1:
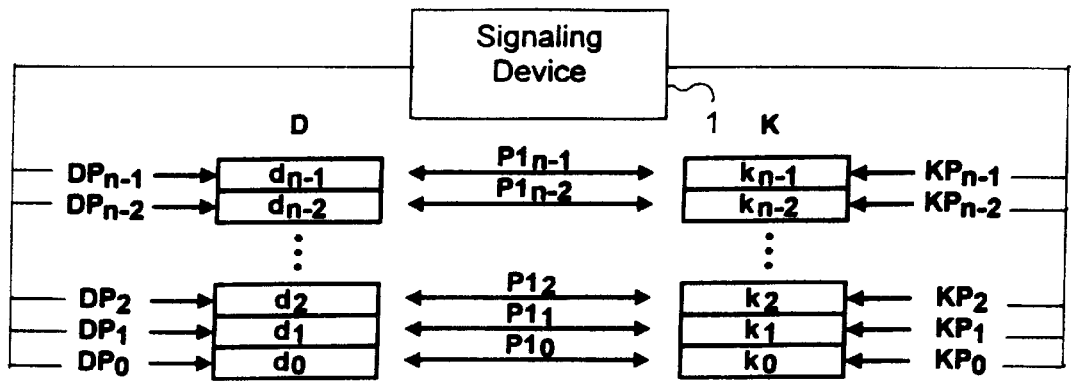
FIG. 1 is block diagram of operations in a first program loop.

Referring now to the figures of the drawing in detail and first, particularly, to FIG. 1 thereof, the circular buffer is distinguished by a signaling device 1 which is configured to signal a jump of a write pointer and/or of a read pointer from an end of the memory to a beginning of the memory and/or vice versa. The signaling is preferably instigated by an address generation unit that generates or manages the write and/or read pointers.

In the example considered, the signaling consists in the setting or resetting or changeover of an identifier (flag). In principle, however, it can be effected in any other desired manner. What is important for the example presently being considered is the fact that the signaling is carried out in a manner which enables it to be perceived by a program which accesses the circular buffer, in particular to be used as a condition for a conditional jump instruction.

In the example considered, an identifier is used to control a sequence of a program that accesses the circular buffer.

The program may be configured for filtering data representing audio, video or other signals. For this purpose, the data must be multiplied by a multiplicity of coefficients. In FIG. 1 thereof, there are shown data and coefficients stored in separate circular buffers. The circular buffer that is referred to below as data buffer D has n memory segments for the storage of n data words $d_0$ to $d_{n-1}$. The circular buffer which is referred to below as coefficient buffer K has n memory segments for the storage of n coefficients $k_0$ to $k_{n-1}$. Each of the n data words $d_0$ to $d_{n-1}$ is to be multiplied by each of the n coefficients $k_0$ to $k_{n-1}$.

Figure 2:
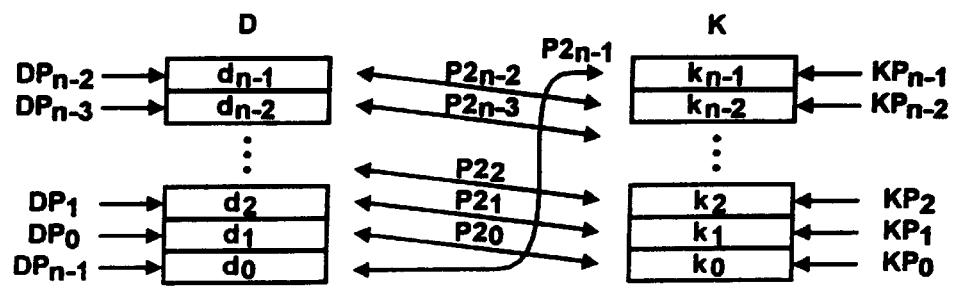
FIG. 2 is a block diagram of the operations taking place during a subsequent execution of a second program loop.
Figure 3:
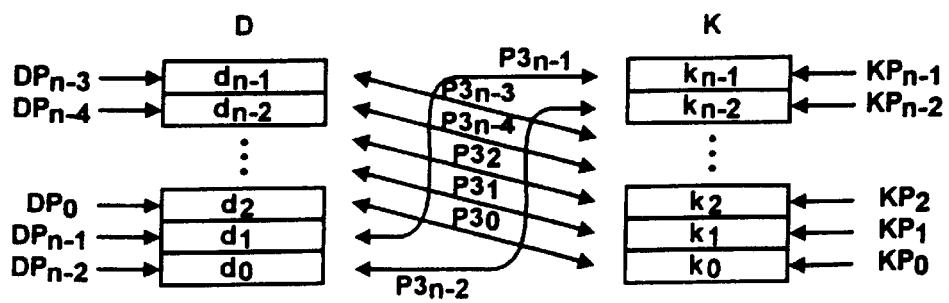
FIG. 3 is a block diagram of the operations taking place during the subsequent execution of a third program loop.

This is done by execution of n program loops, the first, the second and the third of which are illustrated diagrammatically in FIGS. 1 to 3.

In the first program loop illustrated in FIG. 1, the products $d_0*k_0, d_1*k_1, \ldots$ and $d_{n-1}*k_{n-1}$ are formed. Double arrows $P1_0$ to $P1_{n-1}$ in FIG. 1 identify which data word is multiplied by which coefficient, the indices specifying the order in which the respective multiplications are carried out. The data word and the coefficient which are to be respectively multiplied by one another are in turn selected via the data pointers $DP_0$ to $DP_{n-1}$ and coefficient pointers $KP_0$ to $KP_{n-1}$, respectively, the indices of the respective pointers specifying the order in which the latter succeed one another.

In the first cycle of the program loop illustrated in FIG. 1, the data word which is addressed by the data pointer $DP_0$, that is to say the data word do, and the coefficient that is addressed by the coefficient pointer $KP_0$, that is to say the coefficient $k_0$, are multiplied by one another. The data pointer and the coefficient pointer are then incremented, with the result that in the second program loop cycle, which follows the first program loop cycle, the data word that is addressed by the data pointer $DP_1$, that is to say the data word $d_1$, and the coefficient which is addressed by the coefficient pointer $KP_1$, that is to say the coefficient $k_1$, are multiplied by one another. The operation is repeated until finally, in an n-th program loop cycle, the data word which is addressed by the data pointer $DP_{n-1}$, that is to say the data word $d_{n-1}$, and the coefficient which is addressed by the coefficient pointer $KP_{n-1}$, that is to say the coefficient $k_{n-1}$, are multiplied by one another. If the data pointer and the coefficient pointer are then incremented anew, they jump, since they are in each case at the end of the memory areas forming the circular buffers D and K, automatically back to the beginning of the respective memory areas. The return or the immediately imminent return of the coefficient pointer at the same time initiates an action which signals the return and, as has already been explained above, consists in the setting, resetting or changeover of an identifier in the case of the example considered.

After each program loop cycle (before the respective next program loop cycle), a check is made in each case to see whether a return of the coefficient pointer is signaled by the state of the identifier. If this is the case, then a next program loop cycle is not carried out, in other words the execution of the program loop is ended. Afterwards, the data pointer is incremented and consequently points to the next data word (the data word $d_1$).

Proceeding from this state (the data pointer points to the data word $d_1$ and the coefficient pointer points to the coefficient $k_0$), the second program loop illustrated in FIG. 2 is carried out. The products $d_1*k_0, d_2*k_1, \ldots$ and $d_0*k_{n-1}$ are formed in the second program loop. Double arrows $P2_0$ to $P2_{n-1}$ in FIG. 2 identify which data word is multiplied by which coefficient, the indices specifying the order in which the respective multiplications are carried out. The data word and the coefficient that are to be respectively multiplied by one another are in turn selected via the data pointers $DP_0$ to $DP_{n-1}$ and coefficient pointers $KP_0$ to $KP_{n-1}$, respectively, the indices of the respective pointers specifying the order in which the latter succeed one another.

In the first cycle of the program loop illustrated in FIG. 2, the data word which is addressed by the data pointer $DP_0$, that is to say the data word $d_1$, and the coefficient which is addressed by the coefficient pointer $KP_0$, that is to say the coefficient $k_0$, are multiplied by one another. The data pointer and the coefficient pointer are then incremented, with the result that in the second program loop cycle, which follows the first program loop cycle, the data word which is addressed by the data pointer $DP_1$, that is to say the data word $d_2$, and the coefficient which is addressed by the coefficient pointer $KP_1$, that is to say the coefficient $k_1$, are multiplied by one another. The operation is repeated until finally, in an n-th program loop cycle, the data word which is addressed by the data pointer $DP_{n-1}$, that is to say the data word do, and the coefficient which is addressed by the coefficient pointer $KP_{n-1}$, that is to say the coefficient $k_{n-1}$, are multiplied by one another.

If the data pointer and the coefficient pointer are then incremented anew, the coefficient pointer jumps, since it is at the end of the memory area forming the circular buffer K, automatically back to the beginning of the memory area. The data pointer has already executed the return beforehand (before the n-th program loop cycle). The return or the immediately imminent return of the coefficient pointer at the same time again initiates the setting, resetting or changeover of the identifier that signals such events.

If the check of the state of the identifier, which check is made as in the case of the first program loop, reveals that a return of the coefficient pointer is signaled by the identifier, then a next program loop cycle is not carried out, in other words the execution of the program loop is ended. Afterwards, the data pointer is incremented and consequently points to the next data word (the data word $d_2$)

Proceeding from this state (the data pointer points to the data word $d_2$ and the coefficient pointer points to the coefficient $k_0$), the third program loop illustrated in FIG. 3 is carried out. The products $d_2*k_0$, $d_3*k_1$, ... and $d_1*k_{n-1}$ to formed in the third program loop. Double arrows $P3_0$ to $P3_{n-1}$ in FIG. 3 identify which data word is multiplied by which coefficient, the indices specifying the order in which the respective multiplications are carried out. The data word and the coefficient which are to be respectively multiplied by one another are in turn selected via the data pointers $DP_0$ to $DP_{n-1}$ and coefficient pointers $KP_0$ to $KP_{n-1}$, respectively. The indices of the respective pointers specifying the order in which the latter succeed one another.

In the first cycle of the program loop illustrated in FIG. 3, the data word which is addressed by the data pointer $DP_0$, that is to say the data word $d_2$, and the coefficient which is addressed by the coefficient pointer $KP_0$, that is to say the coefficient $k_0$, are multiplied by one another. The data pointer and the coefficient pointer are then incremented, with the result that in the second program loop cycle, which follows the first program loop cycle, the data word which is addressed by the data pointer $DP_1$, that is to say the data word $d_3$, and the coefficient which is addressed by the coefficient pointer $KP_1$, that is to say the coefficient $k_1$, are multiplied by one another. The operation is repeated until finally, in an n-th program loop cycle, the data word which is addressed by the data pointer $DP_{n-1}$, that is to say the data word $d_1$, and the coefficient which is addressed by the coefficient pointer $KP_1$, that is to say the coefficient $k_{n-1}$, are multiplied by one another.

If the data pointer and the coefficient pointer are then incremented anew, the coefficient pointer jumps, since it is at the end of the memory area forming the circular buffer K, automatically back to the beginning of the memory area. The data pointer has already executed the return beforehand (before the n–1-th program loop cycle). The return or the immediately imminent return of the coefficient pointer at the same time again initiates the setting, resetting or changeover of the identifier that signals such events.

If the check of the state of the identifier, which check is carried out as in the case of the program loops described above, reveals that a return of the coefficient pointer is signaled by the identifier, then a next program loop cycle is not carried out. In other words, the execution of the program loop is ended.

It is necessary for further, more precisely a total of n, program loops to be executed before all the data words are multiplied by all the coefficients. The execution of the program loops in each case being ended when the return of the coefficient pointer is signaled.

The use of the coefficient buffer K in a manner such that the jump of the coefficient pointer and/or other defined behavior of the same can be used as a termination condition of a program loop currently being executed makes it possible to dispense with the control and checking of a loop counter. Dispensing with the loop counter or comparable devices (realized by hardware or software) proves to be advantageous in a number of respects. On the one hand, the program loops can be processed with less complexity and/or faster (because the initialization and the alteration, necessary for each loop cycle, of the loop counter reading can be dispensed with). On the other hand, program interruptions such as interrupts and the like can be handled more simply and faster (because a loop counter no longer has to be buffer-stored in the stack).

The loop instructions usually used to instruct program loops can be replaced by conditional jump instructions.

In the example considered, the coefficient pointer in each case defines the location from which the next coefficient is to be read; in other words it is a straightforward read pointer. Accordingly, what is signaled is the return of a read pointer from the end of the memory area forming the coefficient buffer to the beginning of the same. As an alternative or in addition, a jump of the read pointer from the beginning of the memory area forming the coefficient buffer to the end thereof and/or jumps of a combined write/read pointer or of a write pointer can also be signaled. In this case, the jumps of the write pointer and of the read pointer and/or jumps of the same from the end of the memory to the beginning of the memory and from the beginning of the memory to the end of the memory can be signaled identically or differently. The signaling of a write and/or read pointer jump can be deactivated, revoked or reset automatically after a predetermined period of time has elapsed, at the instigation of the program or circuit section interrogating or evaluating the signaling, or in response to other events.

I claim:

1. A method for operating a circulating memory, which comprises:

addressing a memory having a beginning and an end, with at least one of a write pointer and a read pointer;

outputting a jump signal upon an occurrence of a jump by at least one of the write pointer and the read pointer from the end of the memory to the beginning of the memory; and configuring the jump signal so that it is recognizable by an instruction of a program using the memory.

2. The method according to claim 1, which comprises outputting a further jump signal upon an occurrence of a jump by at least one of the write pointer and the read pointer from the beginning of the memory to the end of the memory.

3. The method according to claim 1, wherein the instruction is a conditional jump instruction.

4. The method according to claim 1, which comprises defining and using the memory so that the jump of at least one of the write pointer and the read pointer coincides with an intended end of a program loop.

5. The method according to claim 1, which comprises performing the outputting step by one of setting, resetting and changing over an identifier.

6. The method according to claim 5, which comprises putting the identifier into a state signaling the occurrence of no jump of the write pointer and the read pointer in response to an external instigation.

7. The method according to claim 1, which comprises outputting different jump signals to differentiate the occurrence of:

the jump of the write pointer from the end of the memory to the beginning of the memory;

the jump of the write pointer from the beginning of the memory to the end of the memory;

the jump of the read pointer from the end of the memory to the beginning of the memory; and the jump of the read pointer from the beginning of the memory to the end of the memory.

8. The method according to claim 1, which comprises instigating the jump signal with an address generation unit generating at least one of the write pointer and the read pointer.

9. The method according to claim 1, which comprises instigating the jump signal with an address generation unit managing at least one of the write pointer and the read pointer.

10. In a circulating memory addressed by at least one of a write pointer and a read pointer and having a beginning and an end, an apparatus for operating the circulating memory, comprising:

a signaling device for generating a jump signal signaling the occurrence of a jump by at least one of the write pointer and of the read pointer from the end of the circulating memory to the beginning of the circulating memory, said jump signal configured to be recognizable by an instruction of a program using the circulating memory.

11. The apparatus according to claim 10, wherein said signaling device generates a further jump signal upon an occurrence of a jump by at least one of the write pointer and of the read pointer from the beginning of the circulating memory to the end of the circulating memory.

* * * * *